United States Patent
Marquardt et al.

[11] Patent Number: 5,908,675
[45] Date of Patent: Jun. 1, 1999

[54] GLASS LAMINATE AND METHOD OF MAKING SAME

[75] Inventors: Reinhold Marquardt, Gelsenkirchen; Peter Costa, Witten, both of Germany

[73] Assignee: Flachglas Automotive GmbH, Witten, Germany

[21] Appl. No.: 08/694,911

[22] Filed: Aug. 9, 1996

[30] Foreign Application Priority Data

Aug. 10, 1995 [DE] Germany .......................... 195 29 449

[51] Int. Cl.⁶ .................................................. E06B 3/24
[52] U.S. Cl. .............................. 428/34; 428/81; 428/126; 428/192; 428/209; 428/323; 428/330; 428/347; 428/349; 428/378; 428/415; 428/421; 428/423.3; 428/424.8; 428/425.6; 428/441; 427/163; 427/341; 427/441; 525/330.7; 525/331.7; 156/99; 156/106; 156/305; 156/310
[58] Field of Search ............................... 428/34, 34.4, 81, 428/126, 192, 209, 323, 329, 330, 339, 347, 349, 378, 391, 415, 421, 422, 424.6, 424.8, 423.3, 425.6, 441, 484, 912; 156/106, 99, 305, 320, 333, 310; 525/331.7, 330.7, 330.8; 427/341, 441, 407.1, 407.3, 163

[56] References Cited

U.S. PATENT DOCUMENTS

| 4,046,951 | 9/1977 | Stefanik | 428/412 |
| 4,204,029 | 5/1980 | Batchelor et al. | 428/441 |
| 4,284,677 | 8/1981 | Herliczek | 428/192 |
| 4,711,805 | 12/1987 | Helmer et al. | 428/323 |

FOREIGN PATENT DOCUMENTS

| 0 391 165 | 10/1990 | European Pat. Off. . |
| 310 065 | 4/1929 | United Kingdom . |

Primary Examiner—William Krynski
Assistant Examiner—Abraham Bahta
Attorney, Agent, or Firm—Herbert Dubno

[57] ABSTRACT

A glass laminate comprising panes of glass held together by a bonding layer is provided with an edge seal by the drying of an ethylene polymer emulsion such that the emulsion thins out along the edge of the glass panes.

12 Claims, 4 Drawing Sheets

F I G. 7
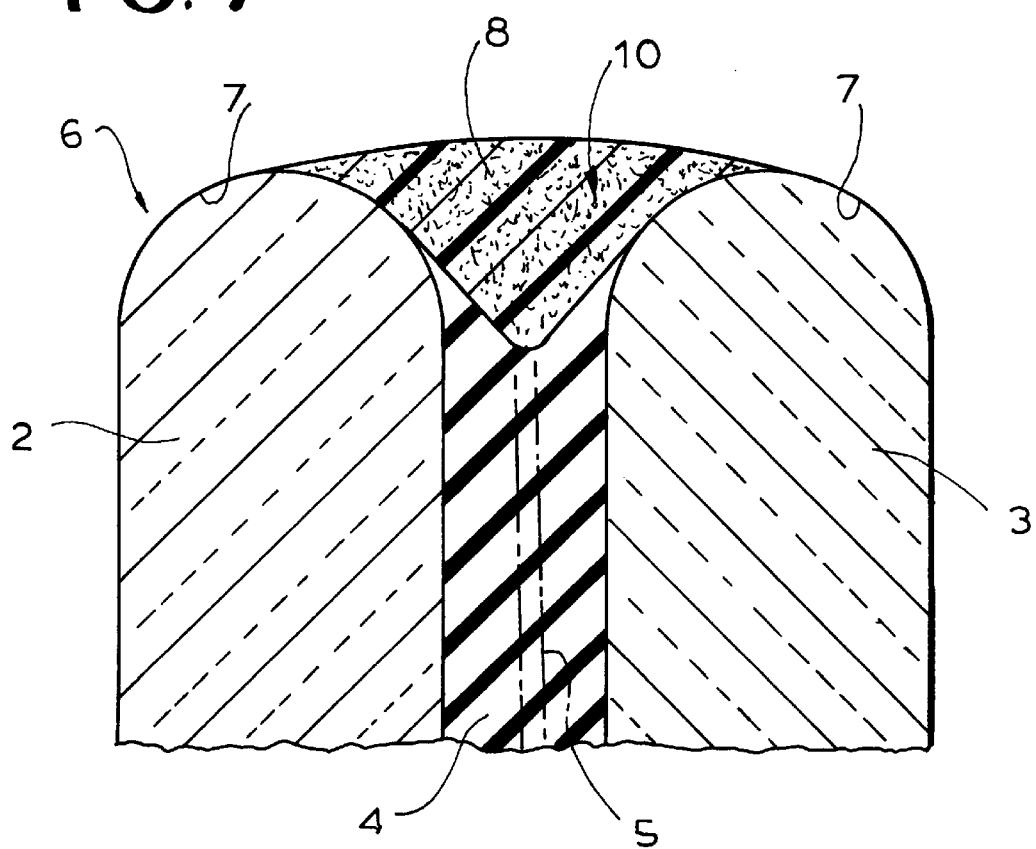
F I G. 8
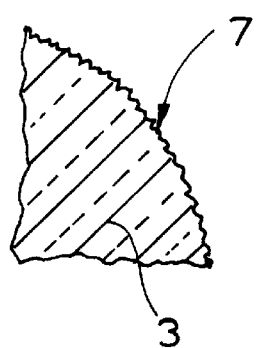

GLASS LAMINATE AND METHOD OF MAKING SAME

FIELD OF THE INVENTION

Our present invention relates to a glass laminate having an outer glass pane, an inner glass pane and a bonding layer consisting of one or more layers and in which an optically-effective layer can be integrated. The invention also relates to a method of making such a glass laminate.

BACKGROUND OF THE INVENTION

Glass laminates are commonly used wherever so-called safety glass is of advantage, e.g. in automotive vehicle windows and the like where shattering of the glass may be a problem because it can endanger the occupants of the vehicle.

For this reason it has become common practice in the safety-glass art to laminate an outer glass pane to an inner glass pane with at least one layer of a bonding synthetic resin material.

The glass laminate can have a simple or complex perimetral edge in which the edge surfaces of the two glass panes and of the bonding layer are incorporated.

The term "edge" is here used to refer to the planar, rounded or beveled surfaces which run along the boundaries of each of the glass panes generally transverse to the broad surfaces thereof. The term "edge" when used without reference to the edge surfaces will then be reserved for the junction between the aforementioned edge surface and the broad base of the glass pane and is represented in cross section by a corner.

The perimetral edge will thus then be the simple or complex structure formed along the boundary of the glass laminate by the two edge surfaces of the glass pane and the edge surface of the bonding layer or layers. A simple perimetral edge can be one which is planar and in which the edge surfaces of the glass panes and the bonding layer are level with one another. A complex perimetral edge will generally be one in which the edge surface of one glass pane is set back from the edge surface of the other, in which the edge surface of the bonding layer is set back from one or both of the edge surfaces of the glass panes and in which the edge of the glass laminate can thus have a groove and/or can be stepped.

The reference of an optically-effective coating will generally refer to a metallic or metal oxide coating which can be applied to one or both of the glass panes to the bonding layer or on a foil which is sandwiched between the glass panes and thus is integrated with the bonding layer.

The synthetic resins which can be used for the bonding layer are generally known and include polyvinylbutyral or ethylenevinylacetate and polyurethanes. The glass laminates which are fabricated can be used in construction and in the motor vehicle industries, as noted, wherever safety glass is required.

The glass laminates which have been described have lives which can be measured in decades although they are subject to various influences which restrict the useful life. These can include static or dynamic mechanical stresses, thermal stresses which are often superimposed upon mechanical stresses, for example from exposure to sunlight and the like.

It is important that the laminate be formed in such manner that corrosive action, delamination and loosening of the bond between the glass panes is avoided as much as possible and for that moisture penetration into the perimetral edge of the glass laminate should be prevented. The term "corrosion" is used here in its most general sense and includes all deteriorating influence, including moisture penetration, damage to functional layers such as to an infrared reflecting silver layer, etc.

In order to reduce the effect on the laminate of such influences, it is common to completely or partially seal the perimetral edge and thereby maintain the long useful life of the glass laminate.

EP 0 391 165 A3 describes the sealing of the edge of a glass laminate of automotive vehicle window glass by means of a synthetic resin of the fluoropolymer, polybutene-polymer or butylpolymer type applied to a planar or simple perimetral edge of the glass laminate. The sealing of the perimetral edge has not, however, been fully satisfactory. For some time it has been known to provide the perimetral edge with a groove (UK Patent 310 065) which widens outwardly and receives a plastic seal not described in detail in this reference.

In neither case has the application of plastics by prior methods to the perimetral edge been fully satisfactory. In the past, the plastic has been doctored onto the perimetral edge in the form of a paste by a blade or the like. This method is not compatible with serial production techniques and it is difficult to obtain a completely uniform sealed edge.

The sealing layer is not, moreover, a structure layer which is capable of imparting strength to the glass laminate. It furthermore does not have a naturally-occurring contour or configuration or surface so that the nature of the seal will depend largely on the manipulative steps with which it is applied.

OBJECTS OF THE INVENTION

It is, therefore, the principal object of the present invention to provide an improved glass laminate for the purposes described which is amenable to serial and mass production, has an improved perimetral edge seal and avoids the drawbacks of glass laminates previously described.

Another object of the invention is to provide an improved method of making a glass laminate with an increased useful life.

Still another object of the invention is to provide a glass laminate and method of making same which has a simpler construction than earlier glass laminates and nevertheless can have a greater useful life and is less prone to penetration of detrimental substances into the bonding layer.

SUMMARY OF THE INVENTION

These objects are attained with a glass laminate consisting of an outer glass pane, an inner glass pane and a bonding layer consisting of one or more layers of a bonding synthetic resin, optionally having an integrated optically-effective coating, bonding the glass panes together and forming therewith a simple and/or a complex perimetral edge.

The invention is characterized by the following features:

1.1) The perimetral edge is sealed with a structure layer of a sealing synthetic resin which follows the macrogeometry of the perimetral edge, and 1.2) The structure layer consists of an emulsion-break surface resulting from drying of the flowable emulsion of the sealing plastic which is applied after the shape of the sealing layer has been determined by the surface tension of the emulsion. The structure layer itself spreads thinly onto the edge surfaces of the glass panes and over the edges thereof in a stepless or step-free manner.

More particularly, the glass laminate can comprise:

an outer glass pane;

an inner glass pane;

at least one bonding layer between the glass panes and laminating the glass panes together by the at least one bonding layer, the glass panes having respective edge surfaces transverse to broad faces of the glass panes defining together with an edge surface of the at least one bonding layer a perimetral edge of the glass laminate; and a dried structure layer of an emulsion of a sealing synthetic resin following a macrogeometry of the perimetral edge and sealing same, the structure layer conforming to a surface-tension configuration of a flowable emulsion of the sealing synthetic resin thinning steplessly outwardly onto the respective edge surfaces of the glass panes from a thicker region to intermediate thinning outer regions, and having an emulsion-break surface.

A structure layer according to the invention is a layer which is not shaped by tools. It has a natural structure, in this case, one which is determined by surface tension. It attaches to the surfaces of the perimetral edge with high adhesion and defines with its own surface the surface of the sealed perimetral edge. It contributes to the structural strength of the laminate.

According to a method aspect of the invention, the laminate can be produced by the steps of:

(a) bonding an outer glass pane to an inner glass pane with at least one bonding layer between the glass panes, the glass panes having respective edge surfaces transverse to broad faces of the glass panes defining together with an edge surface of the at least one bonding layer a perimetral edge of the glass laminate;

(b) applying to the perimetral edge a flowable ethylene-polymer-in-water emulsion to form a structure layer of the emulsion following a macrogeometry of the perimetral edge and sealing same, the structure layer conforming to a surface-tension configuration thinning steplessly outwardly onto the respective edge surfaces of the glass panes from a thicker region intermediate thinning outer regions; and (c) drying the surface layer to seal the perimetral edge and break the emulsion, thereby forming an emulsion-break surface on the surface layer.

The emulsion is a flowable liquid when applied and thus forms a layer which is shaped by surface tension but bridges singularities in the perimetral edge, like corners, angles, bevels, sharp edges and the like by smoothing out over them, to end any outwardly-thickening portions.

The invention is based upon our discovery that a sealing layer which, as described, is a structure layer formed from an emulsion and has a shape governed by the surface tension of the emulsion, surprisingly can extend over critical regions and protect these regions with a high useful life and seal itself in spite of the singularities. The structure layer can resist extreme static and dynamic mechanical stresses and extreme thermal stresses even at these singularities.

Detrimental corrosion phenomena, delamination and moisture penetration are limited or eliminated. Where different materials of the laminate contact one another and form interfaces especially prone to such penetration, the surface tension shaping of the sealing layer may cause additional quantities of the sealing material to accumulate and thus ensures sealing of any crack or microcrack. An especially important advantage of the invention is that the emulsion can be applied simply and without problems like a coloring agent or dye.

Emulsions of the type used with the present invention can be contrasted with suspensions and dispersions. Emulsions have colloidal droplets of liquid in the disperse phase in the continuous phase which is usually water. The droplet diameter is usually 1 to 50 $\mu$m. In a suspension there is a disperse distribution of extremely small but marcomolecular particles of solids in a liquid phase so that suspensions appear cloudy when a light shines through it. The term "dispersion" is used to describe a system consisting of two or more phases and usually containing a dispersant, all of the phases being solid, liquid or gas. However, when the term "emulsion" is used in connection with the present invention, we do not wish to exclude the possibility that the disperse phase also includes solid components.

The emulsion with which the invention operates breaks upon contact with the perimetral edge surfaces and during the drying operation. The dispersing agent and the continuous phase evaporate and an emulsion-break surface of the structure layer is formed.

Thickened portions of the structure layer are produced at corners in the manner described and the thin flared out portions of the drying emulsion penetrate into the microstructure of the perimetral edge and bond readily to the glass panes, especially where they have been ground to provide a reliable seal so as neither oxygen nor water vapor can penetrate between the structure layer and the glass panes into the region of the bonding layer.

According to a feature of the invention, the edge surfaces of the two glass panes are ground and the thinning portions of the structure layer fan out onto these ground edge surfaces.

The perimetral edge of the glass laminate can have any of a variety of configurations. For example, in all of the cases described previously and to be described, the edge surfaces of the glass panes can be beveled, rounded or planar. Even when the perimetral edge is level, the outer surface of the structure layer can have a convex rounded configuration as imparted by the surface tension. The viscosity and surface tension can vary over the thickness of the structure layer with resulting variations in the configuration thereof.

When the perimetral edge is formed with a longitudinal groove because of a setback of the bonding layer, the groove base can be planar, concave, convex or of a V cross section. The structure layer will be found to have at corners of the groove cross section rounded thickening defined by the surface tension of the emulsion. This grooved embodiment has the advantage that the contact surfaces between the structure layer and the glass panes or the glass pane edges is especially large.

According to another feature of the invention, one of the glass panes is set back from the other or one of the glass panes projects beyond the other and at the junction between the projecting portion of the glass pane and the adjacent bonding layer, there is likewise a rounded thickening of the emulsion due to the surface tension. The invention also includes an embodiment in which the flanks of the groove converge inwardly or diverge outwardly by grinding of the glass panes so that the groove has a trumpet shape cross section and the structure layer thus has a thick region that extends cord-like along the groove while nevertheless having its configuration fully defined by the surface tension. The thick structure layer can result from numerous applications of the emulsion and drying so that the configuration is not tool formed.

While a variety of sealing emulsion compositions can be used, it is desirable that the plastic of the sealing emulsion be transparent or translucent. It has been found that a preferred structure layer is composed of an ethylene polymer, especially a polyethylene wax or a polyethylene copolymer wax. The term "wax" is now used for a series of synthetic products which, as a rule, have the following characteristics.

At temperatures up to about 40° C. or higher, they are sufficiently solid and of a coarse to fine crystalline configuration or amorphous, transparent to opaque but not glass-like. At a temperature above 40° C. or a higher temperature, they may melt without decomposition and without stringiness. Such waxes differ from other synthetic resin products in that the latter as a rule between 50° C. and 90° C. and in exceptional cases at temperatures up to about 20° C. transform into low viscosity melts and are practically free from ash-forming compounds. The invention thus utilizes polyethylene waxes which include polyethylene-copolymer waxes.

A wax consisting of copolymer of ethylene and a co-component containing organic acid groups where the acid compounds are capable of copolymerization or are capable of chain-forming or other chemical reactions can be employed as well. Such polyethylene waxes and dispersions are marketed by BASF Aktiengesellschaft under the designations Luwax, Sicolub and Poligen.

The ethylene polymer is preferably used in the form of an ethylene polymer in a water emulsion with the emulsion being applied in a thickness of 5 to 8 µm.

When the surfaces of the glass are ground to promote bonding of the structure layer thereto, a diamond grit with a mean grit size of 76 to 91 µm is used. Surprisingly, the emulsion breaks particularly satisfactorily such ground surfaces and with rapid bonding of the structure layer to the peaks and troughs formed by the grinding operation.

It has been found to be advantageous in addition to the grinding or as an alternative thereto, to treat the glass edge surfaces with reactive organic compounds of aluminum, silicon, vanadium, titanium or zirconium or mixtures of these compounds. Preferably the reactive organic compounds are amino compounds.

Advantageously, the ethylene polymer is a polymer formed from the following composition:

30 to 90 parts by weight ethylene, 0 to 10 parts by weight of at least one further α-olefin with 2 to 12 carbon atoms optionally substituted with at least one halogen atom, 3 to 40 parts by weight of at least one acrylic acid ester or methacrylic acid ester whose ester group is a $C_1$ to $C_{20}$ alkyl, a $C_5$ to $C_{18}$ cycloalkyl or a $C_7$ to $C_{18}$ aralkyl group optionally substituted with at least one halogen atom, 7 to 40 parts by weight of at least one compound selected from the group which consists of acrylic acid and methacrylic acid; and 0 to 10 parts by weight of at least one further copolymerizable monomer.

More specifically, the composition can contain 50 to 75 parts by weight ethylene, 0 to 8 parts by weight of at least one further α-olefin with 2 to 12 carbon atoms optionally substituted with at least one halogen atom, 10 to 25 parts by weight of at least one acrylic acid ester or methacrylic acid ester whose ester group is a $C_1$ to $C_{20}$ alkyl, a $C_5$ to $C_{18}$ cycloalkyl or a $C_7$ to $C_{18}$ aralkyl group optionally substituted with at least one halogen atom, 15 to 25 parts by weight of at least one compound selected from the group which consists of acrylic acid and methacrylic acid; and 0 to 5 parts by weight of at least one further copolymerizable monomer.

BRIEF DESCRIPTION OF THE DRAWINGS

The above and other objects, features, and advantages will become more readily apparent from the following description, reference being made to the accompanying drawing in which:

FIG. 7 is a cross sectional view through the perimetral edge portion of a glass laminate according to another embodiment; and FIG. 8 is a cross sectional view showing in detail the surface roughness produced by diamond grinding of an edge surface of a glass pane.

SPECIFIC DESCRIPTION

Figure 1:
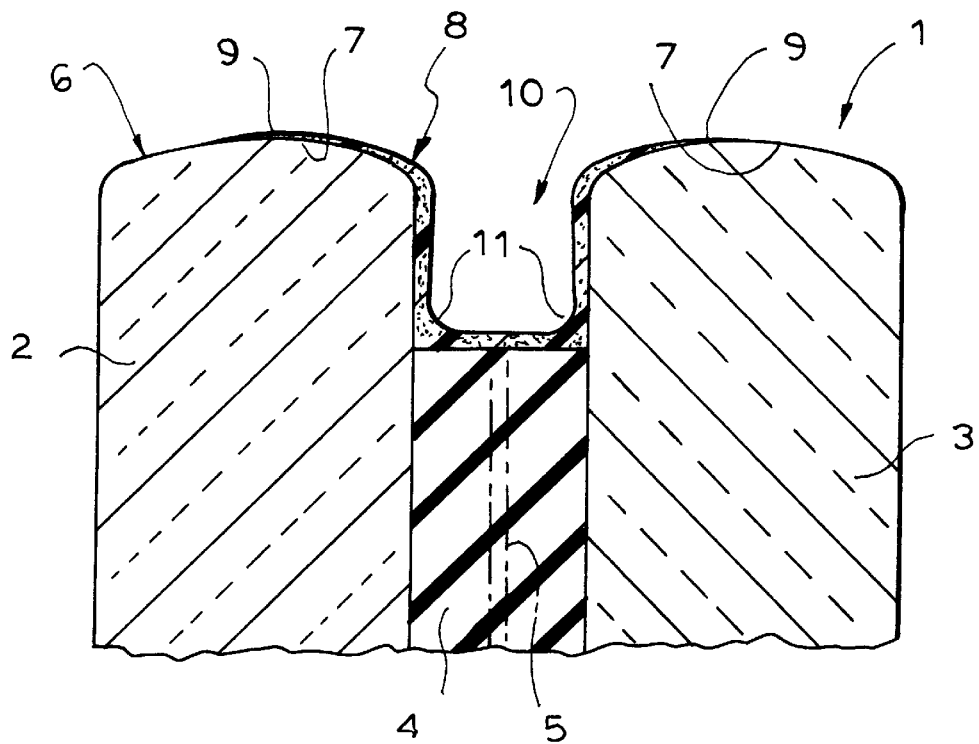
FIG. 1 is a cross sectional view of one embodiment of a glass laminate having a longitudinal groove and each surface of the glass panes terminating at the same level.

FIG. 1 of the drawing shows a glass laminate which can be used as a safety glass for an automotive vehicle which comprises an outer glass pane 2, an inner glass pane 3 and a bonding layer 4 composed of one or more layers and in which an optically-effective layer 5 can be integrated as shown in dot-dash lines. The bonding layer 4 has been illustrated with exaggerated thickness in this Figure and in all of the other Figures in which it is shown. In all of the other Figures as well the same reference numerals are used to indicate equivalent elements.

The glass laminate 1 has a simple or complex perimetral edge and a complex perimetral edge is shown at 6 in FIG. 1 to be made up of the edge surfaces 7 of the glass panes 2 and 3 and the edge surface of the bonding layer 4 which is set back from the edge surfaces 7 to form a groove 10.

In all of the embodiments, the perimetral edge 6 is provided with a structure layer 8 of a sealing synthetic resin, the structure layer 8 following the macrogeometry of the perimetral edge 6. The structure layer 8 has an outer surface which is defined by the breaking of the emulsion and thus is referred to herein as a emulsion-break surface. This type of surface occurs when an emulsion breaks the continuous phase and any emulsifying agents are evaporated and the emulsion dries. The structure layer is originally applied as a formulation and assumes the contours shown in the various Figures as a result of the surface tension to which it is subject. That configuration is retained as the emulsion is dried.

It may be noted that the structure layer has outwardly thinning regions represented at 9 which fan out onto the glass edge surfaces 7 with a thicker region between these thin regions. The glass edge surfaces 7 are ground with diamond abrasive and rounded as shown in FIG. 1. The thinning regions 9 are bonded firmly to the ground glass surfaces formed at the edges 7. The roughened character of this surface is visible in FIG. 8.

Figure 2:
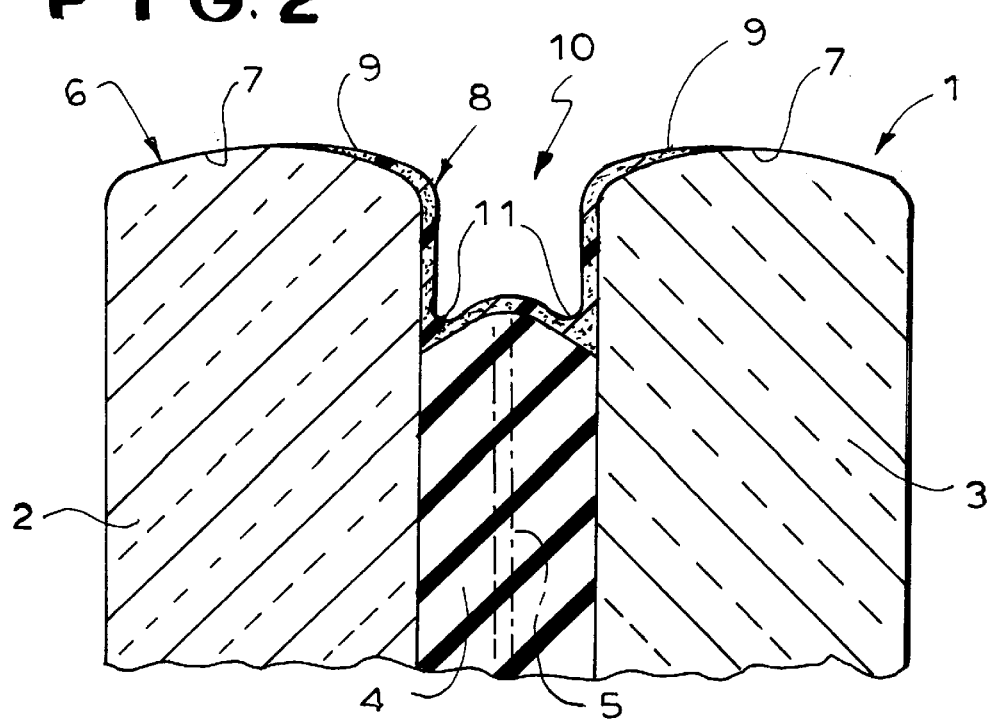
FIG. 2 is a view similar to FIG. 1 showing a different shape of the floor of the groove.

As is also apparent from FIG. 1, thickened portions which are rounded are formed at 11 at the corners of the cross section representing the place at which the broad surfaces of the panes 2 and 3 meet the edge surface and the bonding layer 4. In the embodiment of FIG. 2, the floor of the groove 10 has a ridge unlike the flat floor in the embodiment of FIG. 1.

Figure 6:
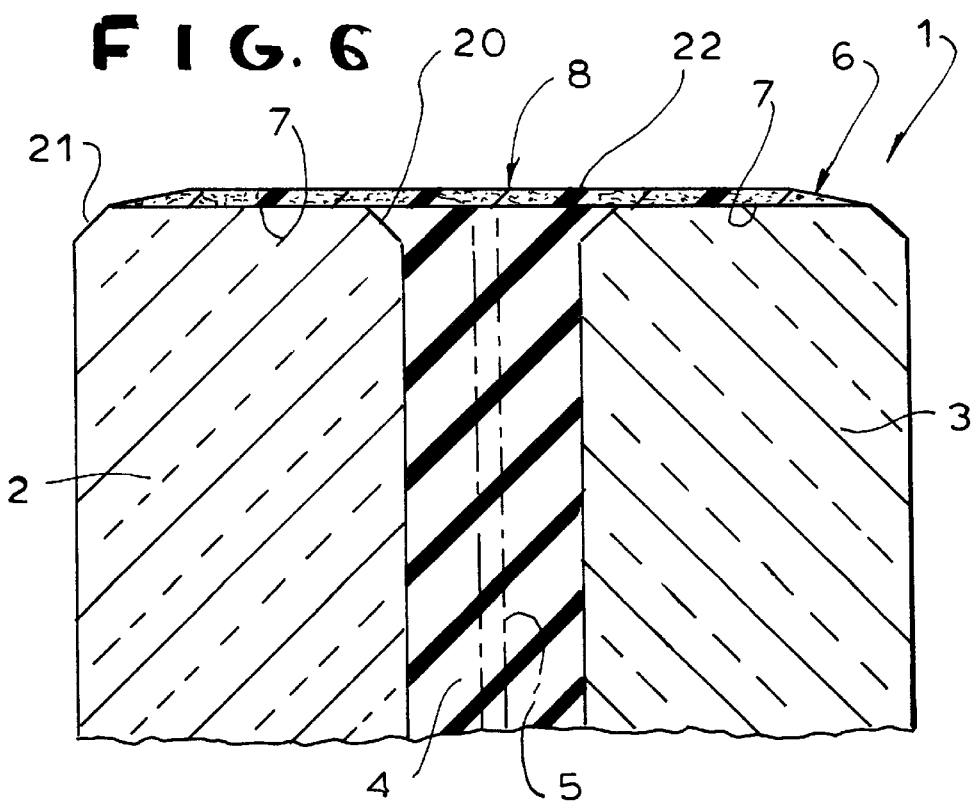
FIG. 6 is a cross sectional view of a glass laminate with a simple perimetral edge.

In the embodiment of FIG. 6, the perimetral edge 6 is somewhat planar and this perimetral edge can be considered a simple perimetral edge. The glass panes 2 and 3 here are beveled at 20 and 21 and the structure layer 8 has an outwardly convex rounded surface 22.

More complex configurations of the perimetral edge are seen in the embodiments of FIGS. 1, 2, 4 and 7 wherein the longitudinal groove 10 is provided. In these embodiments as well, the thickened regions 11 are provided at the junctions between the floor of the groove and the walls of the groove formed by the glass panes. While the shape of the structure layers 8 is defined in each case by the surface tension, the thickness of the structure layer and of the regions 11 is determined by the amount of the emulsion applied.

Figure 3:
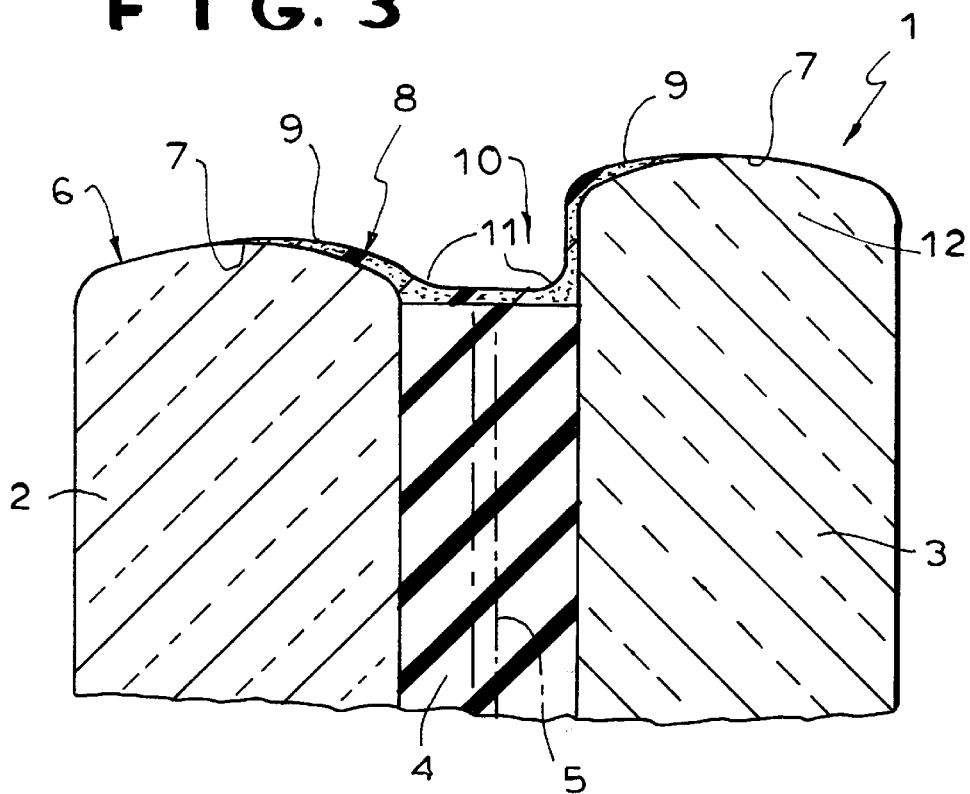
FIG. 3 is a cross sectional view of a glass laminate having staggered edge surfaces of the glass panes.
Figure 4:
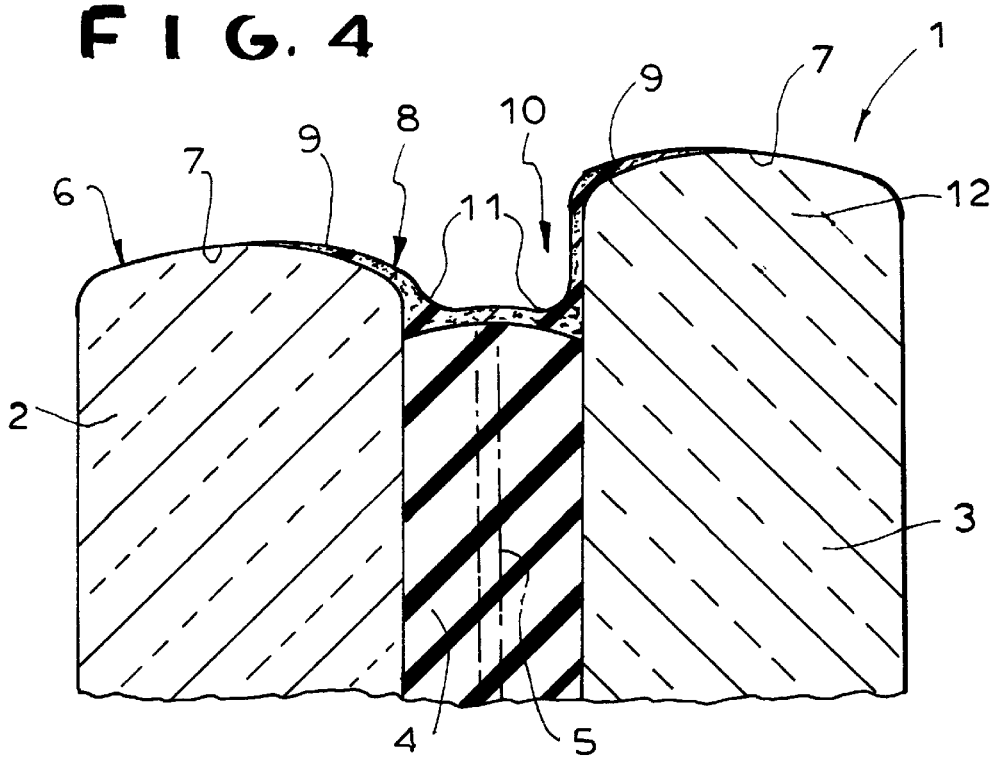
FIG. 4 is a cross sectional view of a modification of the embodiment of FIG. 3.

In the embodiments of FIGS. 3 and 4, the outer glass pane 2 is set back form the edge surface 7 of the inner glass pane 3.

FIGS. 3 and 4 also have bonding layers 4 with a flat floor for the groove 10 and a convex floor for the groove 10, respectively.

The embodiment of FIG. 7 utilizes rounded edge surfaces 7 formed by grinding and a structure layer 8 formed in a number of applications of the emulsion so that the structure layer 8 fills the outwardly flaring groove 10 which has a trumpet-like cross section.

Figure 5:
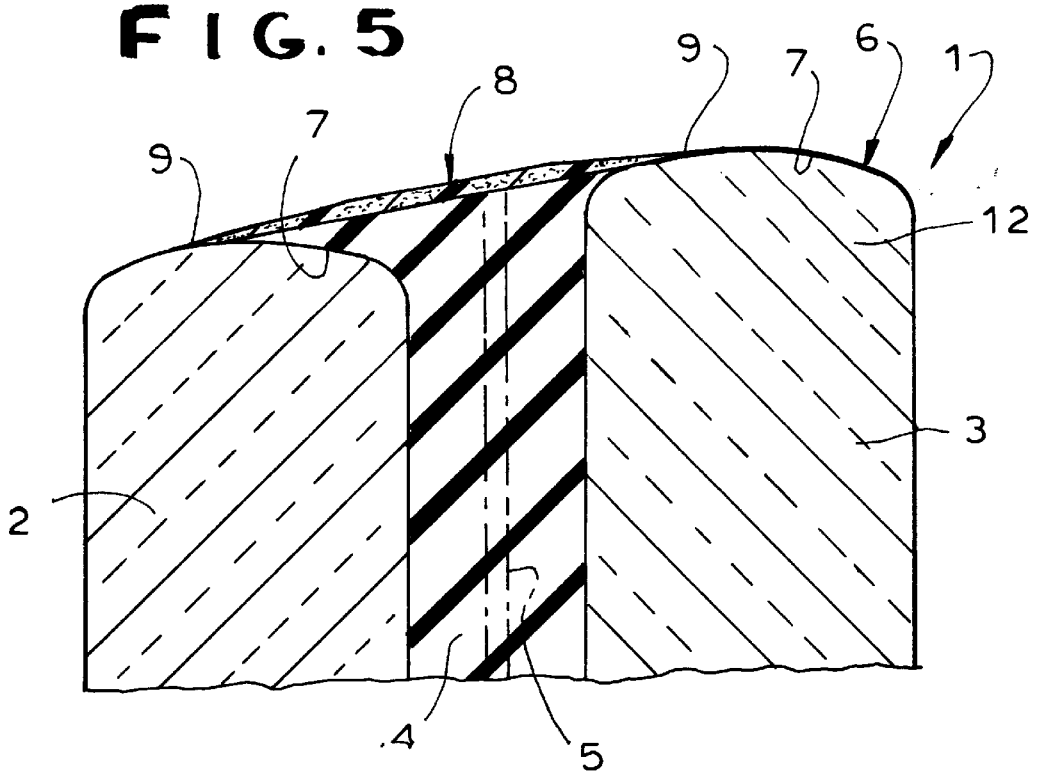
FIG. 5 is a cross sectional view of a glass laminate in which the bonding layer is flush with the edge surfaces of the glass pane.

In FIG. 5 the structure layer 8 extends in a flat manner between the set-back pane 2 and projecting pane 3, but no groove is provided here since the bonding layer 4 is flush with the edge surfaces of these glass panes. The structure layer in each case is however a transparent or translucent layer.

By way of example, for the embodiment of FIG. 1, the glass panes are ground with diamond particles with a grid of about 80 $\mu$m and the glass panes are bonded with a polyvinylbutyryl bonding layer and then an emulsion of an ethylene polymer which is formed by polymerizing a composition consisting of 60 parts by weight ethylene, four parts by weight of a mixture of $C_2$ to $C_{12}$ α-olefin, 15 parts by weight of equal parts acrylic acid ester and methacrylic acid ester, the esterifying group in each case being $C_6$ alkyl, 10 parts by weight acrylic acid and 10 parts by weight methacrylic acid. Polymerization is carried out by conventional emulsion polymerization in water and the resulting emulsion is applied as can be seen from FIG. 1 to the perimetral edge of the glass laminate by spraying in a thickness of about 6 $\mu$m.

The emulsion is then dried to form the structure layer 8 as shown in FIG. 8. The drying is carried out in warm air. The structure layer is found to be highly adherent and to be free from singularities and to be capable of sealing the perimetral edge against the incursion of moisture or air.

We claim:

1. A glass laminate comprising:
   an outer glass pane;
   an inner glass pane;
   at least one bonding layer between said glass panes and laminating said glass panes together by said at least one bonding layer, said glass panes having respective edge surfaces transverse to broad faces of said glass panes defining together with an edge surface of said at least one bonding layer a perimetral edge of said glass laminate; and
   a dried structure layer of an emulsion of an ethylene polymer sealing synthetic resin following a macrogeometry of said perimetral edge and sealing same, the structure layer conforming to a surface-tension configuration of a flowable emulsion of said sealing synthetic resin thinning steplessly outwardly onto the respective edge surfaces of said glass panes from a thicker region intermediate thinning outer regions, and having an emulsion-break surface.

2. The glass laminate defined in claim 1 wherein said edge surfaces of said glass panes are ground glass surfaces and said structure layer extends with at least said thinning outer regions onto said ground glass surfaces.

3. The glass laminate defined in claim 1 wherein said edge surfaces are generally level with one another and said structure layer has an outwardly convex shape imparted by surface tension thereto.

4. The glass laminate defined in claim 1 wherein said perimetral edge of the glass laminate has a perimetral groove formed by a setback of said edge surface of said at least one bonding layer from at least one of the edge surfaces of said glass panes and said structure layer at least partly fills said groove and has rounded thickened portions defined by surface tension at corners of the groove as seen in cross section.

5. The glass laminate defined in claim 1 wherein one of said edge portions of one of said glass panes projects outwardly beyond the edge portion of the other of said glass panes, said structure layer having a rounded thickened portion defined by surface tension at a corner between said one of said glass panes and said edge portion of said at least one bonding layer as seen in cross section.

6. The glass laminate defined in claim 1 wherein said edge portions of said glass panes have rounded ground glass configurations outwardly flared from said bonding layer to define a groove which is trumpet-shape in cross section, said structure layer filling said groove.

7. The glass laminate defined in claim 1 wherein said structure layer is composed of a transparent synthetic resin.

8. The glass laminate defined in claim 1 wherein said structure layer is composed of a translucent synthetic resin.

9. The glass laminate defined in claim 1 wherein said structure layer is composed of a polyethylene wax.

10. The glass laminate defined in claim 1 wherein said structure layer is composed of a polyethylene copolymer wax.

11. The glass laminate defined in claim 1 wherein said bonding layer is provided with an optically active layer integrated therein.

12. The glass laminate defined in claim 1 wherein said ethylene polymer synthetic resin is a polymer of:
   30 to 90 parts by weight ethylene,
   0 to 10 parts by weight of at least one further α-olefin with 2 to 12 carbon atoms optionally substituted with at least one halogen atom,
   3 to 40 parts by weight of at least one acrylic acid ester or methacrylic acid ester whose ester group is a $C_1$ to $C_{20}$ alkyl, a $C_5$ to $C_{18}$, cycloalkyl or a $C_7$ to $C_{18}$, aralkyl group optionally substituted with at least one halogen atom,
   7 to 40 parts by weight of at least one compound selected from the group which consists of acrylic acid and methacrylic acid; and
   0 to 10 parts by weight of at least one further copolymerizable monomer, the ethylenic polymer being deposited from water as a dispersed phase.

* * * * *